(12) United States Patent
Cho et al.

(10) Patent No.: US 6,479,804 B2
(45) Date of Patent: Nov. 12, 2002

(54) MICROWAVE OVEN AND METHOD FOR CONTROLLING POWER SAVING MODE THEREOF

(75) Inventors: Young-won Cho, Suwon (KR); Sung-ho Lee, Suwon (KR); Tae-soo Kim, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/918,551

(22) Filed: Aug. 1, 2001

(65) Prior Publication Data

US 2002/0125246 A1 Sep. 12, 2002

(30) Foreign Application Priority Data

Mar. 9, 2001 (KR) .......................................... 01-12340

(51) Int. Cl.[7] .................................................. H05B 6/68
(52) U.S. Cl. ...................................... 219/702; 219/723
(58) Field of Search .............................. 219/702, 723, 219/716, 718, 719, 758

(56) References Cited

FOREIGN PATENT DOCUMENTS

| JP | 07-217906 | | 8/1995 |
|---|---|---|---|
| JP | 08-138851 | | 5/1996 |
| JP | 10-89698 | | 4/1998 |
| JP | 10-89699 | | 4/1998 |
| JP | 10-096518 | | 4/1998 |
| JP | 10-096528 | | 4/1998 |
| JP | 10-261483 | | 9/1998 |
| JP | 11-002410 | | 1/1999 |
| JP | 11055853 | * | 2/1999 |
| JP | 2000046336 | * | 2/2000 |
| JP | 2000214798 | * | 8/2000 |
| KR | 1999-17497 | | 3/1999 |

* cited by examiner

*Primary Examiner*—Teresa Walberg
*Assistant Examiner*—Quang Van
(74) *Attorney, Agent, or Firm*—Robert E. Bushnell, Esq.

(57) ABSTRACT

A microwave oven includes a power supplying part, a cooking chamber, a door of the cooking chamber, a magnetron, and high and low voltage generating parts supplying voltage to the magnetron, further including: a door switch installed on branch lines of a power line toward the high and low voltage generating parts, operating depending on opening and closing the door and selectively connecting the power supplying part with the high and low voltage generating parts; a power saving switch controlling a connection between the power supplying part and the low voltage generating part; and a controller switching off the power saving switch when a predetermined time elapses after the magnetron stops operating. With this configuration, in the microwave oven, a power saving function can be automatically selected, and automatically suspended when the door is opened.

20 Claims, 4 Drawing Sheets

MICROWAVE OVEN AND METHOD FOR CONTROLLING POWER SAVING MODE THEREOF

CLAIM OF PRIORITY

This application makes reference to, incorporates the same herein, and claims all benefits accruing under 35 U.S.C. §119 from an application for MICROWAVE OVEN AND METHOD OF CONTROLLING FOR POWER SAVING MODE THEREOF earlier filed in the Korean Industrial Property Office on Mar. 9, 2001 and there duly assigned Serial No. 12340/2001 by that Office.

BACKGROUND OF THE INVENTION

1. Field of the Invention

The present invention relates in general to a microwave oven and a method for controlling a power saving mode thereof, and more particularly, a microwave oven and a method for controlling a power saving mode thereof, with a power saving function automatically and manually operable.

2. Description of the Related Art

Generally, a microwave oven includes a cooking chamber, a magnetron heating food in the cooking chamber, a component chamber accommodating a high voltage transformer (HVT) and a low voltage transformer (LVT), and a lamp provided at one side of the cooking chamber, illuminating the inside of the cooking chamber.

In order to operate the magnetron, the transformer must generate a very high frequency voltage because the magnetron is operated by the high frequency voltage. Consequently, the transformer generating the high frequency voltage consumes a large amount of power.

Further, in a standby mode, that is, during the time the magnetron does not operate, if the microwave oven is connected to an electric power source, electric power is supplied to internal components such as a display part indicating a cooking state and time, a diode, a sensor, etc. Thus, electric power is unnecessarily wasted.

Most of lamps illuminating the cooking chamber of the microwave oven are turned on during the cooking. However, commonly, a user does not look at the cooking part, and therefore the lamp may waste electric power unnecessarily.

Accordingly, a microwave oven that has a power saving function lowering a power consumption has been developed and is already on the market. The power saving function is performed by canceling an indication of the display part to indicate when the magnetron does not operate or by turning off the lamp of the cooking chamber during operation of the magnetron, so as to prevent the microwave oven from wasting electric power.

However, in the conventional microwave oven equipped with the power saving function, there is the inconvenience that the power saving function may be set up by only manual manipulation with a power saving button.

SUMMARY OF THE INVENTION

Accordingly, the present invention has been made keeping in mind the above-described shortcoming and user's need, and an object of the present invention is to provide a microwave oven and a method for controlling a power saving mode thereof, which can perform and suspend a power saving mode automatically according as a door is closed and opened.

The above and other objects of the present invention may be accomplished by the provision of a microwave oven including a power supplying part, a main body forming a cooking chamber, a door opening and closing the cooking chamber,.a magnetron performing cooking, and high and low voltage generating parts connected to the power supplying part in parallel and supplying voltage to the magnetron, further including: a door switch installed at the junction on which electric lines of the high and low voltage generating parts and the power supplying part meet one another, operating depending on opening and closing the door and selectively connecting the power supplying part with the low or high voltage generating part; a power saving switch provided on a branch line in front of the door switch, controlling a connection between the power supplying part and the low voltage generating part; and a controller switching off the power saving switch and cutting off electric power supplied to the low voltage generating part when a predetermined time elapses after the magnetron stops operating in the case that the door is closed.

A door switching part includes a common contact point connected to the power supplying part, a first contact point connected to the low voltage generating part, and a second contact point connected to the high voltage generating part.

Preferably, the microwave oven further includes a power saving selection part selecting the power saving mode and a normal mode, a lamp illuminating the inside of the cooking chamber, and a lamp switch controlling electric power supplied to the lamp from the power supplying part so as to turn on/off the lamp; and wherein the controller switches off the lamp switch in the case that the magnetron is operating at the power saving mode.

The controller switches off the power saving switch and the lamp switch in the case that the magnetron is not operating at the power saving mode, so as to perform the power saving function.

Effectively, the controller returns the power saving mode into the normal mode when the door is opened.

Effectively, the controller switches on the power saving switch when the magnetron operates again.

According to another aspect of the present invention, the above and other objects may be also achieved by the provision of a method for controlling a power saving mode of a microwave oven including the steps of: determining whether or not the power saving mode is selected; and cutting off electric power supplied to the lamp during operation of the magnetron at the power saving mode, and cutting off electric power supplied to the low voltage generating part when a predetermined time elapses after the magnetron stops operating at a normal mode.

Herein, the method further includes the step of re-supplying electric power to the low voltage generating part when the door is opened.

BRIEF DESCRIPTION OF THE DRAWINGS

The present invention will be better understood and its various objects and advantages will be more fully appreciated from the following description taken in conjunction with the accompanying drawings, in which.

DESCRIPTION OF THE PREFERRED EMBODIMENTS

Preferred embodiments of the present invention will be described in more detail with Is reference to the accompanying drawings.

Figure 1:
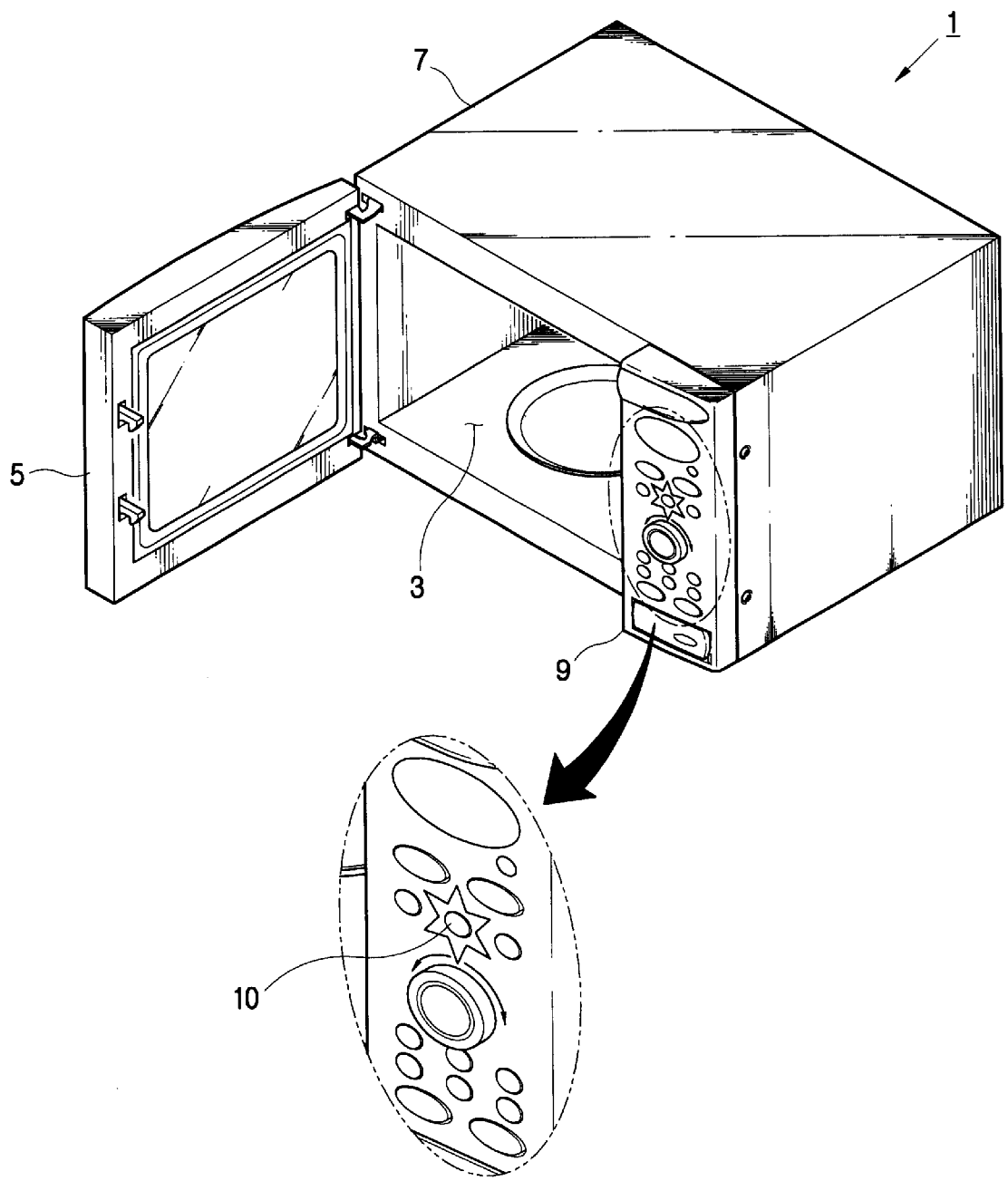
FIG. 1 is a perspective view of a microwave oven according to one embodiment of the present invention.

Referring to FIG. 1, a microwave oven 1 according to one embodiment of the present invention includes a main body 7 forming a cooking chamber 3, a door 5 opening and closing the cooking chamber 3, a component chamber provided at one side of the cooking chamber 3 and accommodating a magnetron, a high voltage transformer, etc., and a control panel 9 provided in the front of the component chamber and selecting a plurality of cooking functions.

In the control panel 9 is provided a power saving button 10 as a power saving selection part for selecting a power saving mode. Accordingly, a user can select the power saving mode by pushing the power saving button 10 manually.

Figure 2:
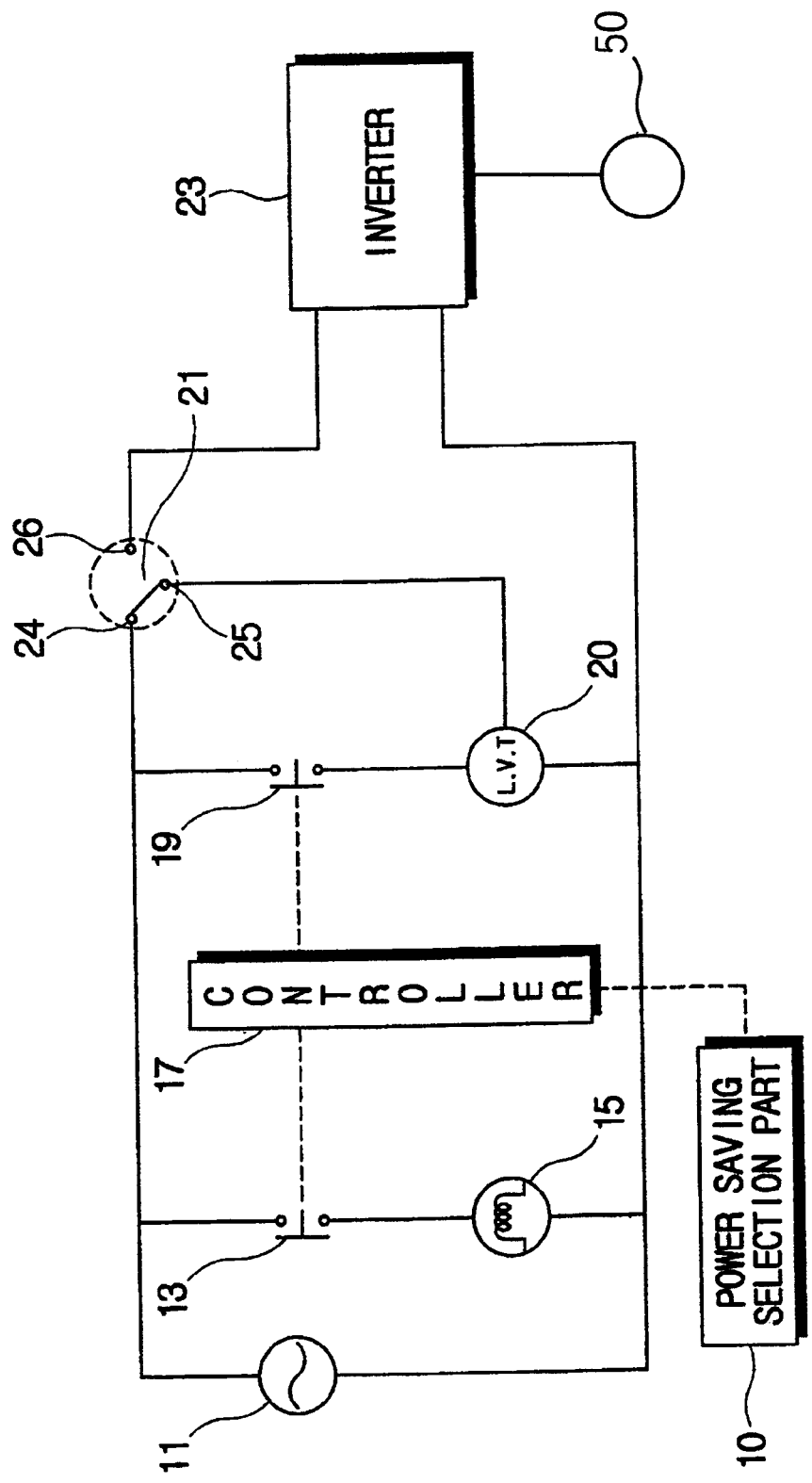
FIG. 2 is a circuit diagram for controlling a power saving mode in the microwave oven in FIG. 1.

Referring to FIG. 2, a circuit controlling the power saving mode in the microwave oven 1 according to one embodiment of the present invention includes a power supplying part 11 supplying electric power, a lamp switch 13 connected with a lamp 15 in series and turning on/off the lamp 15, a high voltage generating part 23 receiving voltage from the power supplying part 11 and generating a high voltage, a low voltage generating part 20 connected with the power supplying part 11 in parallel and supplying voltage to a driving device such as a display device, etc., and the power saving selection part 10 selecting the power saving mode. Hereinbelow, the low voltage generating part 20 and the high voltage generating part 23 will be called an LVT 20 and an inverter 23, respectively, inverter 23 supplying voltage to a magnetron 50.

The circuit controlling the power saving mode further includes a door switch 21 provided on a power supply line, connecting the power supplying part 11 to the LVT 20 or to the inverter 23 according to opening or closing the door 5, a power saving switch 19 provided on a branch line in front of the door switch 21 and controlling electric power to be supplied to the LVT 20 from the power supplying part 11, and a controller 17 controlling the lamp switch 13 and the power saving switch 19 to be switched on/off.

The controller 17 controls the overall driving device including the magnetron, the display device, etc., determines whether the magnetron operates and the states of the door switch 21 and the power saving selection part 10 and then controls the power saving switch 19 and the lamp switch 13 to be switched on/off based on the state of the power saving selection part 10.

The door switch 21 includes a common contact point 24 connected to the power supply part 11, a first contact point 25 connected to the LVT 20, and a second contact point 26 connected to the inverter 23. Accordingly, when the door 5 is opened, the door switch 21 connects the power supplying part 11 with the LVT 20 through the first contact point 25. Oppositely, when the door 5 is closed, the door switch 21 connects the power supplying part 11 with the inverter part 23 through the second contact point 26.

The power saving switch 19 provided on the branch line in front of the door switch 21 controls the connection between the power supplying part II and the LVT 20. That is, if the power saving switch 19 is switched on, electric power is supplied to the LVT 20. Oppositely, if the power saving switch 19 is switched off, electric power is not supplied to the LVT 20.

With this configuration, an automatic power saving mode according to one embodiment of the present invention is set up by switching off the power saving switch 19 by the controller 17 to cut off the electric power supplied to the LVT 20 when the door 5 is closed and the door switch 21 connects the inverter 23 with the power supplying part 11. Oppositely, when the door 5 is opened and the door switch 21 connects the LVT 20 with the power supplying part 11, the controller 17 determines that electric power is supplied to the LVT 20 and switches on the power saving switch 19. Then, the power saving mode is suspended.

On the other hand, a manual power saving mode by pushing the power saving selection part or button 10 is set up by switching off the lamp switch 13 by the controller 17 to cut off the electric power supplied to the lamp 15 after determining whether the power saving mode is selected during operation of the magnetron. Oppositely, if a user pushes the power saving button 10 once again, the controller 17 re-supplies electric power to the lamp 15. Then, the power saving mode is suspended.

Further, the manual power saving mode is set up by switching off the power saving switch 19 by the controller 17 to cut off electric power supplied to the LVT 20 after a user pushes the power saving button 10 when the magnetron stops operating. In the case of suspending the manual power saving mode, if the user opens the door 5, the controller 17 controls the door switch 21 to connect the LVT 20 with the power supplying part 11 through the first contact point 25, like the case of suspending the automatic power saving mode.

Figure 3:
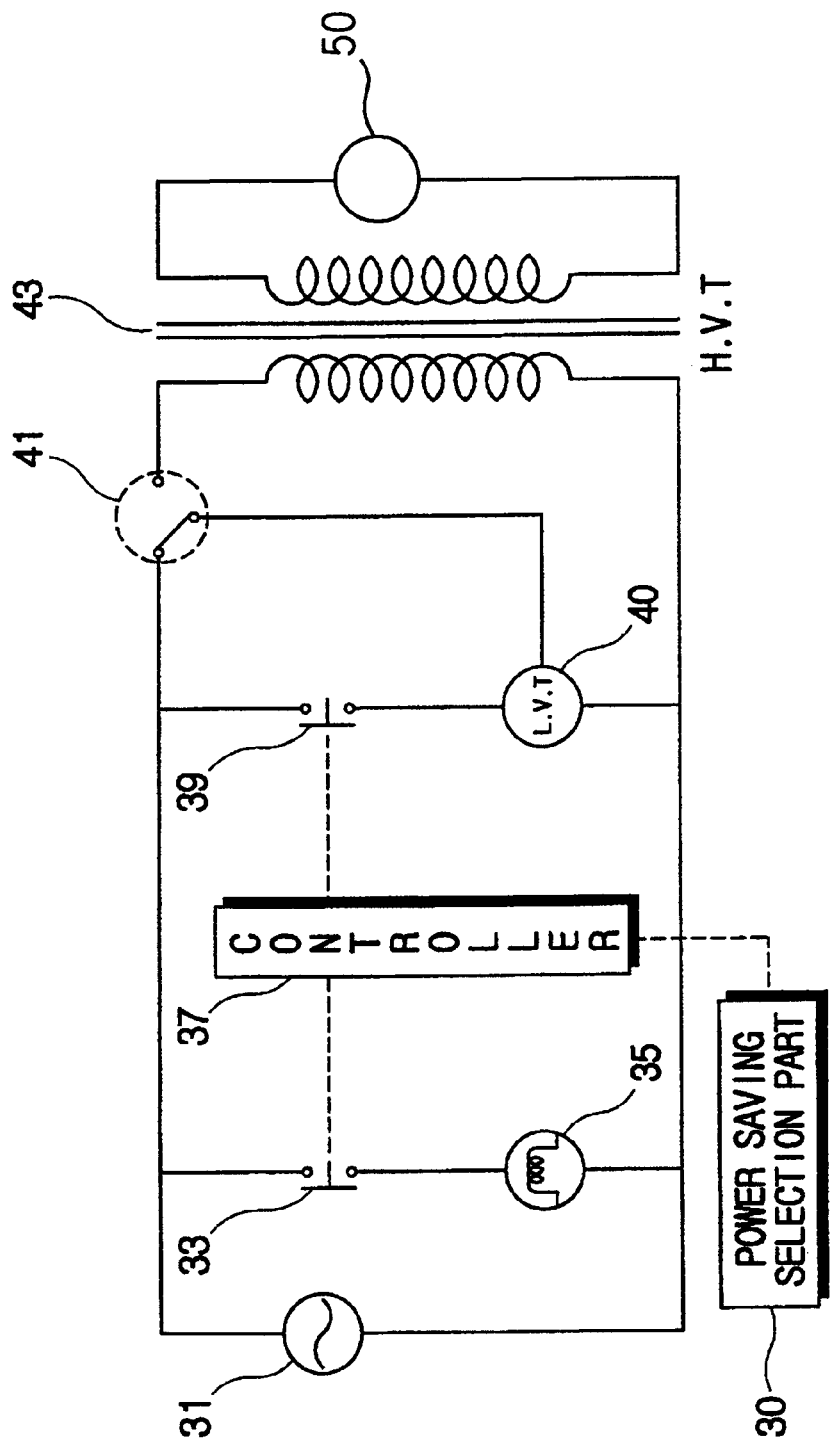
FIG. 3 is a circuit diagram for controlling a power saving mode in a microwave oven according to another embodiment of the present invention.

FIG. 3 is a circuit diagram for controlling a power saving mode in a microwave oven according to another embodiment of the present invention, which shows a circuit controlling a power saving mode in a microwave oven equipped with a transformer. The circuit of FIG. 3 includes a high voltage transformer (HVT), instead of the inverter 23 in the circuit of FIG. 2, and the other parts of this another embodiment of FIG. 3 are the same as in the above described first embodiment of FIG. 2, with the reference numbers 30, 31, 33, 35, 37, 39, 40, 41 and 50 of FIG. 3 corresponding to the reference numbers 10, 11, 13, 15, 17, 19, 20, 21 and 50 of FIG. 2. Therefore, the detailed description for the first embodiment of FIG. 2 will be incorporated herein as to FIG. 3.

Figure 4:
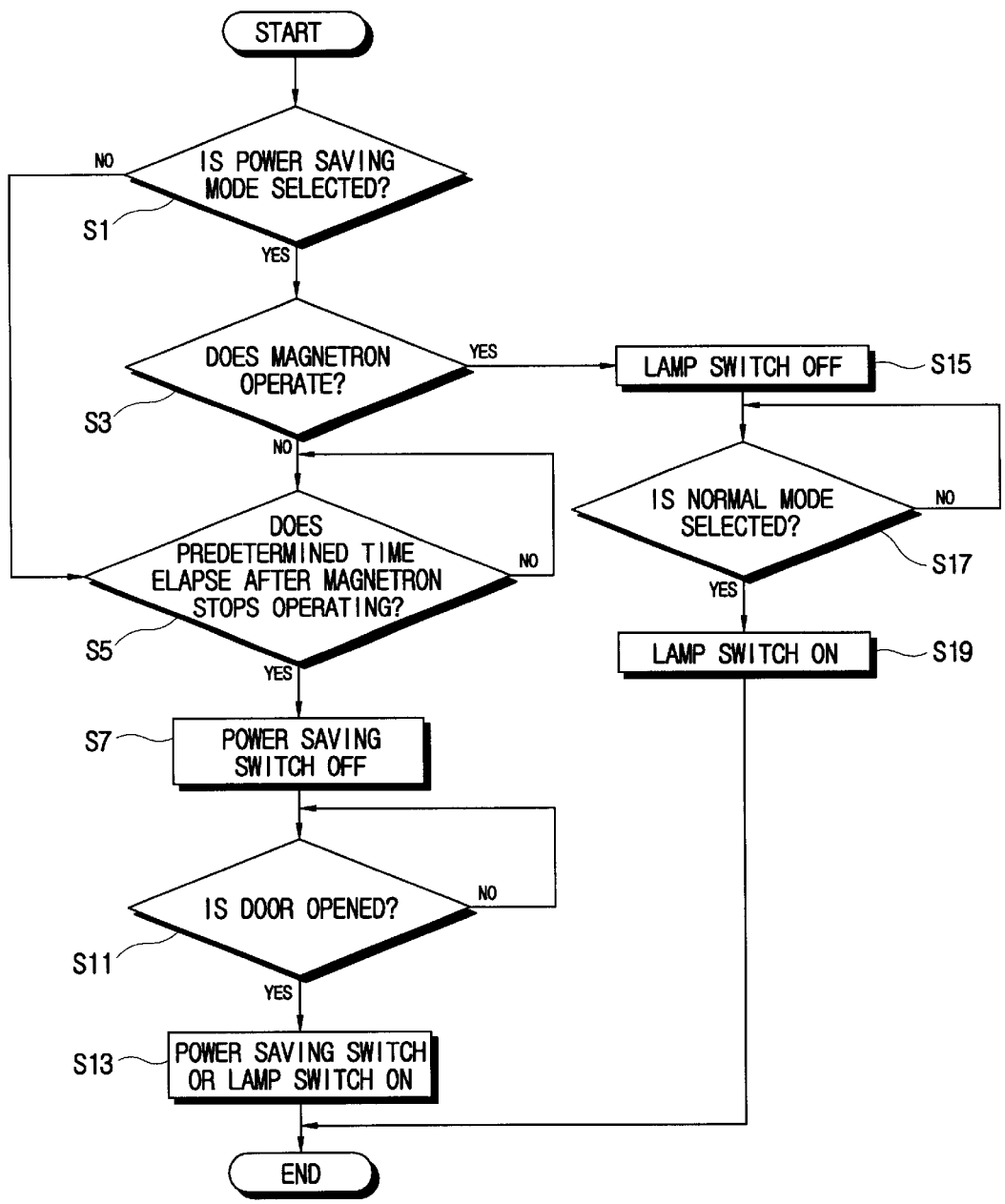
FIG. 4 is a flow chart of controlling a power saving mode in the microwave oven according to the present invention.

FIG. 4 is a flow chart of controlling a power saving mode in a microwave oven according to the present invention. As shown therein, the controller 17 determines whether the power saving button 10 is pushed, that is, whether the power saving mode is selected (S1). If the power saving mode is selected, the controller 17 determines whether the magnetron is operating (S3). If the magnetron is operating, the controller 17 switches off the lamp switch 13 (S15). Further, if the power saving button 10 is pushed once again and thus a normal mode is selected (S17), the controller 17 switches on the power saving switch 19 (S19).

Where the power saving mode is not selected in the step of S1, the controller 17 determines whether a predetermined time elapses after the magnetron stops operating (S5). If the predetermined time elapses, the controller 17 switches off the power saving switch 19 (S7). Further, if a user opens the door 5, the controller 17 switches on the power saving switch 19 (S13).

With this configuration, when the predetermined time elapses after the magnetron stops operating, the power saving mode is automatically selected by cutting off electric power supplied to the LVT. Further, the power saving mode is manually selected by pushing the power saving button by a user to turn the lamp off during operation of the magnetron, or by pushing the power saving button to cut off electric power supplied to the LVT after the magnetron stops operating.

In above-described embodiment, when a user pushes the power saving button, the lamp switch is then turned off. However, it is possible to make the lamp switch automatically turn off after a predetermined time.

In above-described embodiment, the door switching part has three contact points. However, it is possible to make the door switch have two contact points appropriately connected with respect to the power saving switch, to operate depending on opening and closing the door.

In above-described embodiment, when the door is opened, the power saving mode is suspended. However, it is possible to suspend the power saving mode by detecting by the controller when the magnetron operates again by pushing the power saving button.

With this configuration, the present invention provides a microwave oven and a method for controlling a power saving mode thereof, which can automatically perform a power saving function and automatically suspend it when the door is opened. Further, a user can select the power saving function of the microwave oven with user's own hand.

Although the preferred embodiments of the present invention have been disclosed for illustrative purpose, those skilled in the art will appreciate that various modifications, additions and substitutions are possible without departing from the scope and spirit of the invention as disclosed in the accompanying claims.

What is claimed is:

1. A microwave oven, comprising:
   a main body forming a cooking chamber for the microwave oven;
   a door for selectively opening and closing the cooking chamber;
   a magetron for performing cooking by the microwave oven;
   a power supplying part for supplying electric power to the microwave oven;
   a high voltage generating part for connection with the power supplying part for supplying a voltage to the magnetron;
   a low voltage generating part for connection with the power supplying part for supplying a voltage to at least one device of the microwave oven;
   a door switch for selectively connecting the power supplying part with one of the low voltage generating part and the high voltage generating part, the door switch selectively connecting the power supplying part with the low voltage generating part when the door is open and the door switch selectively connecting the power supplying part with the high voltage generating part when the door is closed;
   a power saving switch for selectively controlling a connection of the power supplying part with the low voltage generating part; and
   a controller for selectively switching on and off the power saving switch, the controller for switching off the power saving switch and for cutting off the electric power supplied to the low voltage generating part when a predetermined period of time elapses after the magnetron stops operating when the door is closed.

2. The microwave oven according to claim 1, further comprising:
   a power saving selection part for selecting a power saving mode for the microwave oven and a normal mode for the microwave oven;
   a lamp for illuminating the cooking chamber;
   a lamp switch for controlling the electric power supplied to the lamp from the power supplying part for selectively turning on and off the lamp, with the controller for switching off the lamp switch when the magnetron is operating at the power saving mode.

3. The microwave oven according to claim 2, further comprised of the controller for switching off the power saving switch and the lamp switch when the magnetron is operating at other than the power saving mode.

4. The microwave oven according to claim 3, further comprised of the controller for switching on the power saving switch when the magnetron operates again after the magnetron stops operating.

5. The microwave oven according to claim 2, further comprised of the controller for returning the power saving mode into the normal mode when the door is opened.

6. The microwave oven according to claim 5, further comprised of the controller for switching on the power saving switch when the magnetron operates again after the magnetron stops operating.

7. The microwave oven according to claim 2, further comprised of the controller for switching on the power saving switch when the magnetron operates again after the magnetron stops operating.

8. The microwave oven according to claim 2, further comprised of the high voltage generating part and the low voltage generating part being connected in parallel to the power supplying part.

9. The microwave oven according to claim 1, further comprised of the door switch comprising a door switching part, the door switching part including a common contact point for connection to the power supplying part, a first contact point for connection to the low voltage generating part, and a second contact point for connection to the high voltage generating part.

10. The microwave oven according to claim 9, further comprised of the controller for switching on the power saving switch when the magnetron operates again after the magnetron stops operating.

11. The microwave oven according to claim 9, further comprised of the high voltage generating part and the low voltage generating part being connected in parallel to the power supplying part.

12. The microwave oven according to claim 1, further comprised of the controller for switching on the power saving switch when the magnetron operates again after the magnetron stops operating.

13. The microwave oven according to claim 1, further comprised of the high voltage generating part and the low voltage generating part being connected in parallel to the power supplying part.

14. A method for controlling a power saving mode of a microwave oven, the microwave oven comprising a power supplying part for supplying electric power to the microwave oven, a main body forming a cooking chamber for the microwave oven, a door for selectively opening and closing the cooking chamber, a magnetron for performing cooking by the microwave oven, a lamp for illuminating the cooking chamber, and a high voltage generating part and a low voltage generating part each for selective connection with the power supplying part, with the high voltage generating part for supplying voltage to the magnetron and with the low voltage generating part for supplying voltage to at least one device of the microwave oven, comprising the steps of:

determining whether the power saving mode is selected;

cutting off electric power supplied to the lamp when the magnetron operates at the power saving mode, and cutting off electric power supplied to the low voltage generating part when a predetermined period of time elapses after the magnetron stops operating at a normal mode.

15. The method according to claim 14, further comprising the step of:

re-supplying electric power to the low voltage generating part when the door of the microwave oven is opened after the magnetron stops operating.

16. The method according to claim 15, further comprising the step of:

connecting the high voltage generating part and the low voltage generating part in parallel to the power supplying part.

17. The method according to claim 14, further comprising the step of:

connecting the high voltage generating part and the low voltage generating part in parallel to the power supplying part.

18. A method for controlling electric power in a microwave oven, comprising the steps of:

selectively connecting a power supplying part for supplying electric power to the microwave oven with a low voltage generating part and a high voltage generating part, the low voltage generating part for supplying a voltage to at least one device of the microwave oven and the high voltage generating part for supplying a voltage to a magnetron for performing cooking by the microwave oven, the power supplying part being selectively connected with the high voltage generating part when a door for selectively opening and closing a cooking chamber of the microwave oven is closed, and the power supplying part being selectively connected with the low voltage generating part when the door for the microwave oven is open;

controlling a connection between the power supplying part and the low voltage generating part by a power saving switch; and switching off the power saving switch and cutting off the electric power supplied to the low voltage generating part when a predetermined period of time elapses after the magnetron stops operating when the door of the microwave oven is closed.

19. The method of claim 18, further comprising the steps of:

determining whether a power saving mode of the microwave oven is selected;

cutting off electric power supplied to a lamp for illuminating the cooking chamber of the microwave oven when the magnetron operates at the power saving mode, and cutting off electric power supplied to the low voltage generating part when the predetermined period of time elapses after the magnetron stops operating at a normal mode of the microwave oven.

20. The method according to claim 19, further comprising the step of:

re-supplying electric power to the low voltage generating part when the door of the microwave oven is opened after the magnetron stops operating.

* * * * *